United States Patent [19]
Petroff

[11] 3,838,934
[45] Oct. 1, 1974

[54] MACHINE TOOL
[76] Inventor: Robert J. Petroff, 1703 S. Main St., Lombard, Ill. 60148
[22] Filed: Mar. 2, 1973
[21] Appl. No.: 337,452

[52] U.S. Cl. .................. 408/7, 408/12, 408/130, 408/137
[51] Int. Cl. ........................................ B23b 47/24
[58] Field of Search ............... 408/130, 137, 5, 6, 7, 408/12

[56] References Cited
UNITED STATES PATENTS
| | | | |
|---|---|---|---|
| 3,178,740 | 4/1965 | Dorak | 408/8 |
| 3,224,301 | 12/1965 | Vickers | 408/130 X |
| 3,389,413 | 6/1968 | Van den Kieboom | 408/130 |

Primary Examiner—Francis S. Husar
Attorney, Agent, or Firm—Fitch, Even, Tabin & Luedeka

[57] ABSTRACT

Apparatus for use in tapping or threading wherein a tap or thread forming die is mounted on a tool support spindle which is longitudinally movable with a non-rotatable quill. The spindle is directly rotatably driven by a reversible drive motor and has feed screw means thereon cooperable with a feed nut to effect controlled inward feeding and withdrawal of the tool relative to a workpiece. A control circuit includes pneumatic means to effect rapid advance and retract of the tool relative to the workpiece and further includes means operative to stop rotation of the spindle drive motor should normal inward feeding movement of the spindle and work tool be prevented.

10 Claims, 7 Drawing Figures

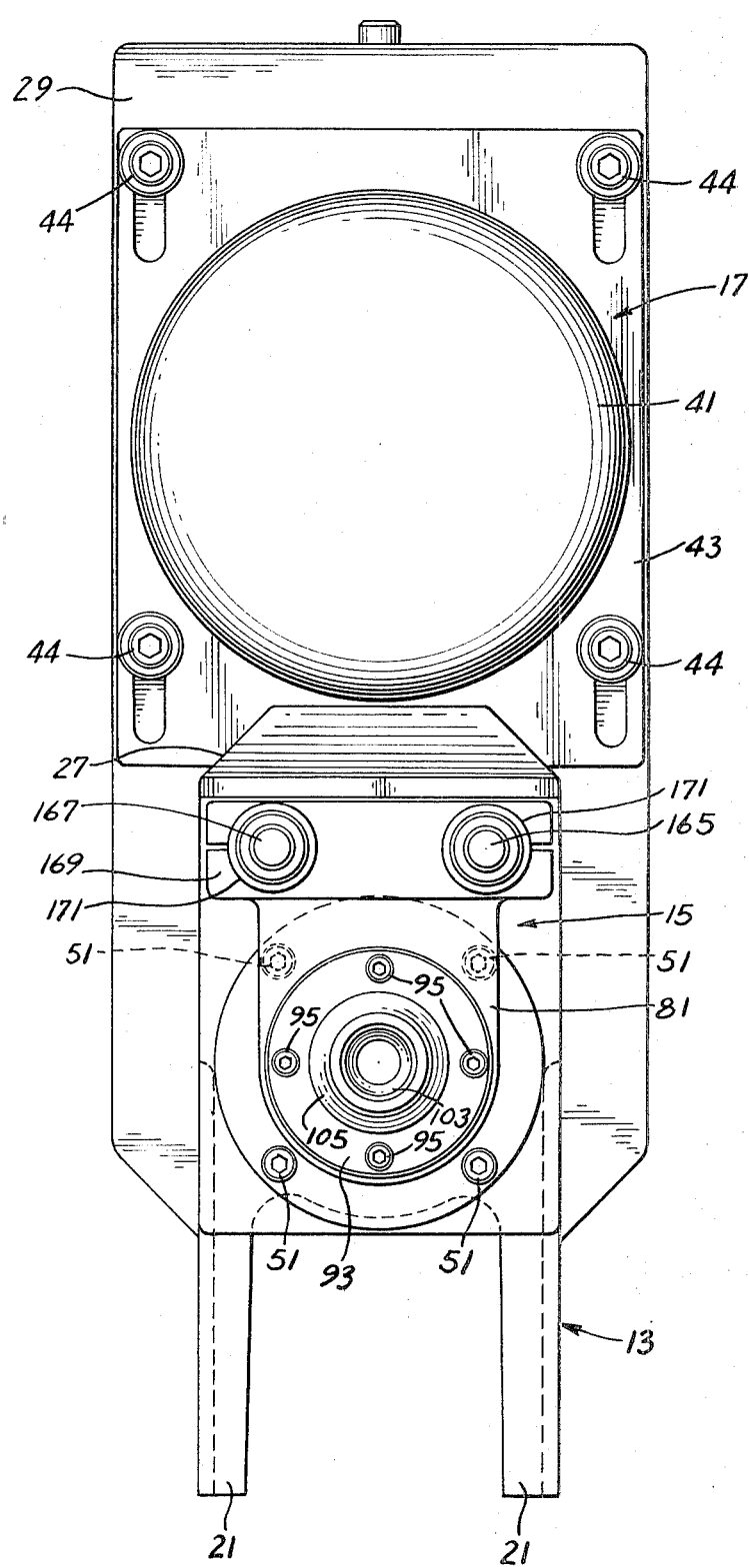

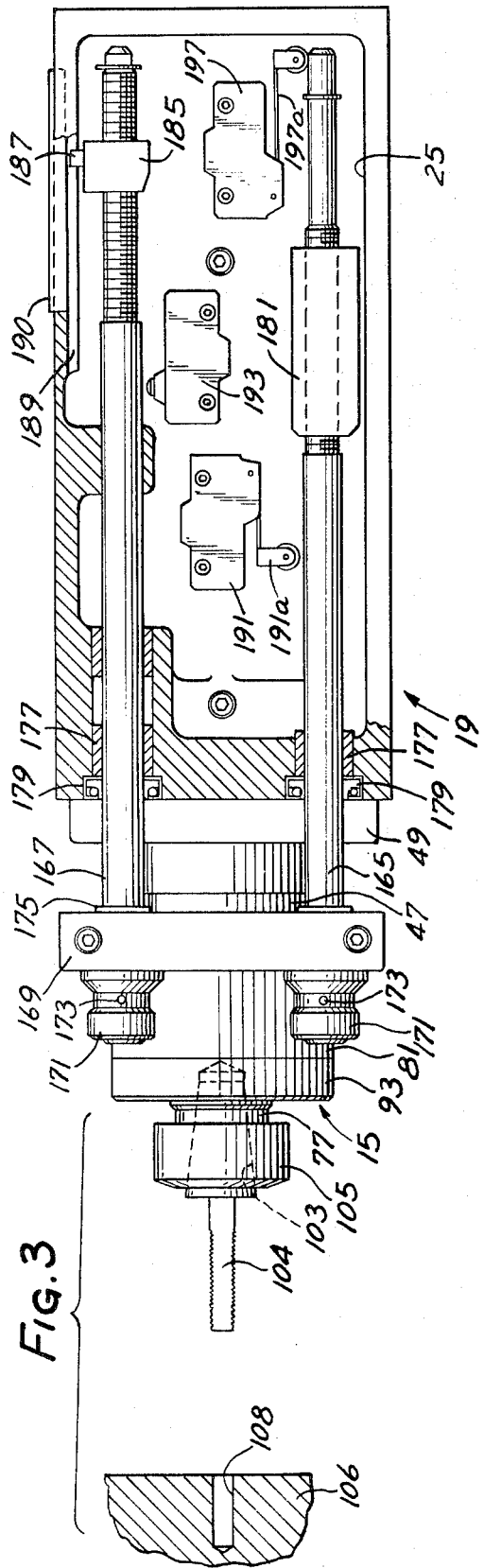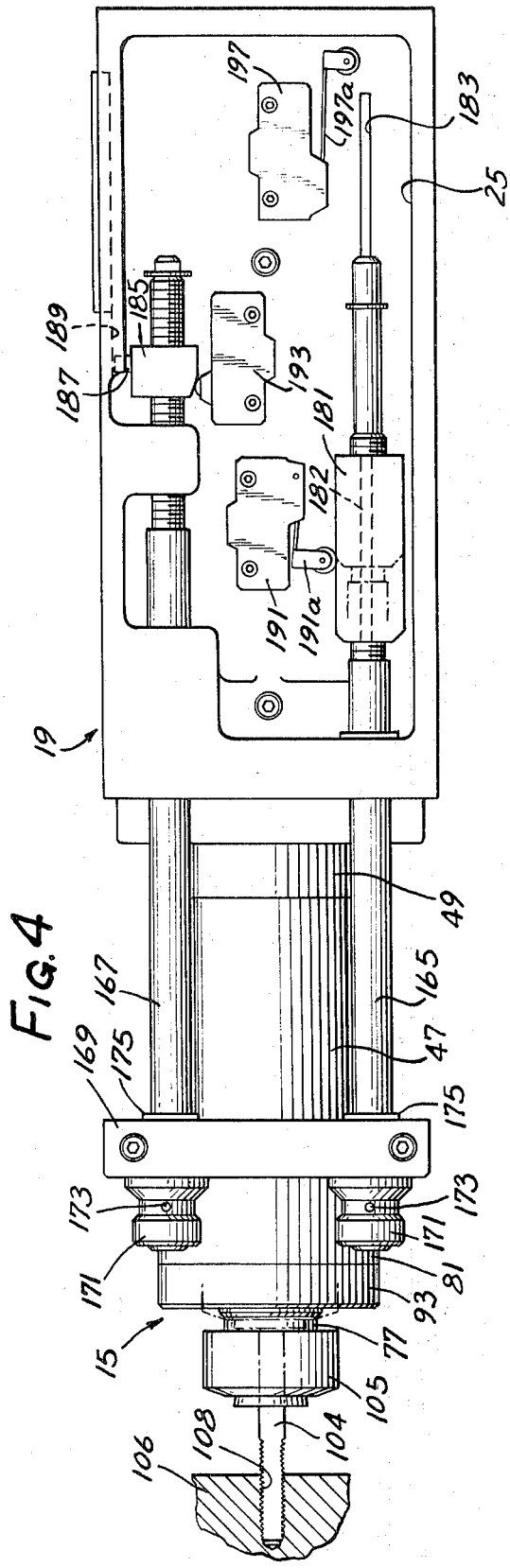

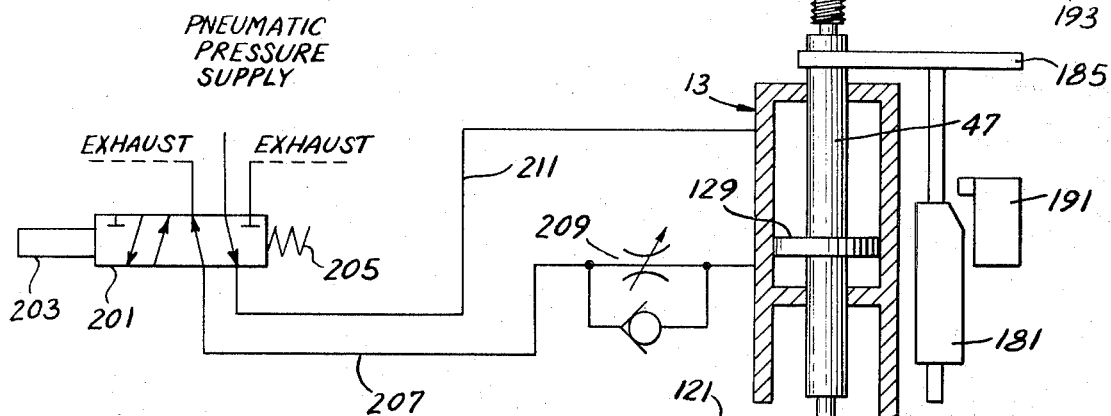
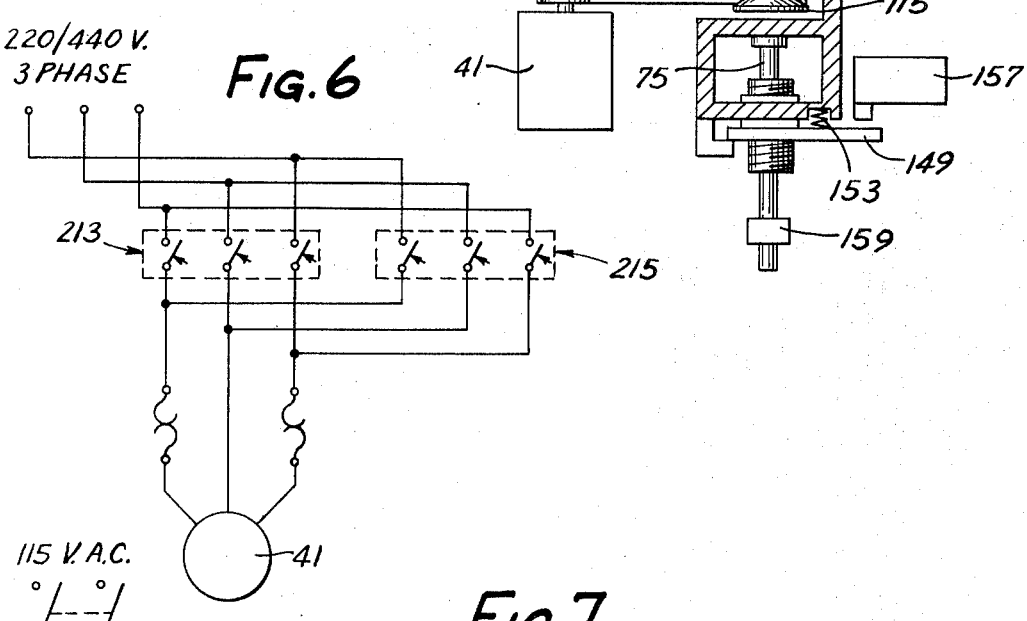
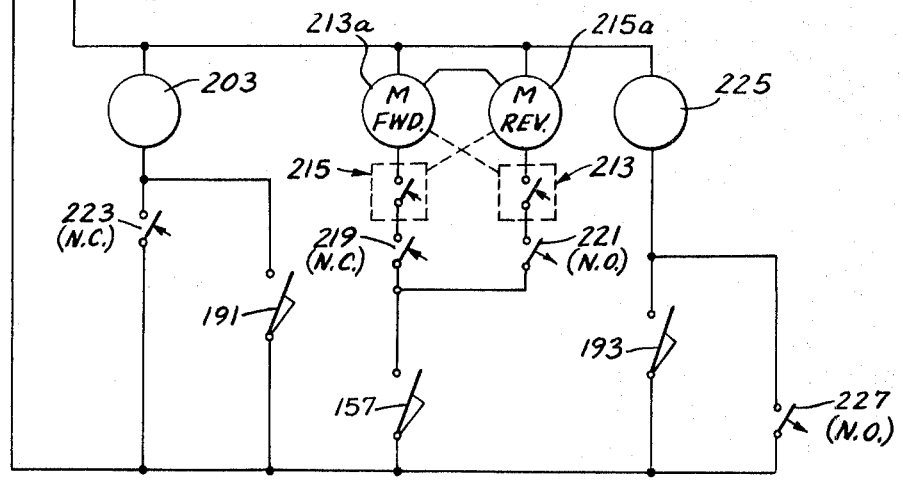

MACHINE TOOL

The present invention relates generally to machine tool apparatus, and more particularly to such apparatus having novel means for effecting controlled advance and retraction of a tool carrying spindle.

Threading apparatus are known by which a tap or thread forming die is advanced to a workpiece, caused to tap a lead hole or externally thread a portion of the workpiece and thereafter returned to a starting position. In one known threading apparatus, a relatively simple tap support structure is advanced by a manually controlled lever to start the tap into a lead hole where it thereafter feeds itself into the lead hole during rotation by virtue of the pitch of the male thread cutting edges. Manual feed threading apparatus are reasonably satisfactory with light work and very small production lots, but are highly inefficient for mass production. Advances in threading apparatus designs have introduced the use of lead screws which threadedly cooperate with feed nuts to control inward feed of a thread forming tool support spindle as the lead screw is rotated relative to the feed nut. The pitch of the thread engagement between the lead screw and feed nut is identical to the desired pitch of the resulting thread so that a highly accurate thread may be cut in the workpiece with the spindle rotated at a relatively high speed.

An example of a tapping apparatus employing lead screw and feed nut means for high speed operation is disclosed in my U.S. Pat. No. 3,690,782, dated Sept. 12, 1972. As therein shown and described, the spindle and tapping tool are advanced to a position adjacent the workpiece by fluid pressure means whereupon clutch means effect interengagement of the spindle with a rotary drive motor to rotate and advance the spindle and tap into the workpiece. Thereafter, the drive motor is reversed to withdraw or retract the tap from the workpiece and the spindle is rapidly retracted to its initial starting position. Use of a clutch mechanism as disclosed in my referenced application has been found to be particularly effective in relatively light work because the rotational driving force of the tap can be controlled to provide the necessary thread cutting forces while insuring an axial force on the tap which is well within the safe strength limits of the tapping tool. Additionally, the referenced tapping apparatus adapts itself to fully automatic or semiautomatic operation for use in highly efficient mass production operation.

It has been found that in relatively heavy work, i.e., wherein the pitch diameter of the formed thread is to be in the order of ½ inch or more, substantially greater cutting forces must be developed by the thread forming or cutting tools. The larger thread forming or cutting tools required for such relatively heavy work necessitate considerably greater spindle driving torque and correspondingly larger size machine elements such as the quill, spindle drive motor, tool support spindle and lead screw. The larger size thread forming and cutting tools are also necessarily more rigid in order to withstand the greater spindle drive torque and the resulting larger cutting forces during thread forming and cutting operations. Because accurate thread forming requires that the rotation of the tool support spindle be very exacting relative to the pitch or feed of the desired thread, it has been found necessary to provide a positive non-clutched rotational drive for the tool support spindle. The positive rotational spindle drive coupled with a positive axial feed of the spindle through the lead screw and feed nut require that means be provided for stopping the spindle drive motor in the event that the spindle is prevented from axial feed movement. The present invention provides a thread forming apparatus wherein a positive rotation of the tool support spindle is effected to obtain the necessary cutting forces, and wherein safety means are provided to stop sindle rotation when axial feed of the spindle is prevented, as when a blind lead hole or no lead hole at all is encountered when utilizing a thread tapping tool.

Accordingly, one of the primary objects of the present invention is to provide novel improved machine tool apparatus which finds particular application in automatic thread forming and tapping operations.

Another object of the present invention is to provide novel apparatus having a rotary drive motor directly connected to a tool support spindle which is cooperable with lead screw means to effect controlled forward feeding of the spindle, and including novel control means to de-energize the drive motor if forward feeding of the spindle is prevented.

Another object of the present invention is to provide thread forming apparatus as described wherein a lead screw nut is restrained against rotation but is axially movable in response to unintentional stoppage of forward feed of the spindle whereby to effect automatic de-energizing of the spindle drive motor.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 2 is an enlarged front end view of the tapping apparatus of FIG. 1;

FIG. 3 is a horizontal sectional view taken generally along the line 3—3 of FIG. 1 showing certain of the control switches and actuating members for effecting automatic control of the tapping apparatus;

FIG. 4 is a view generally similar to FIG. 3 but showing the tapping tool in its fully extended position within a workpiece;

FIG. 5 is a schematic circuit diagram of the pneumatic control circuit for the tapping apparatus of FIG. 1;

FIG. 6 illustrates the electric drive motor circuit diagram; and

FIG. 7 is an electrical control circuit diagram for the tapping apparatus of FIG. 1.

Figure 1:
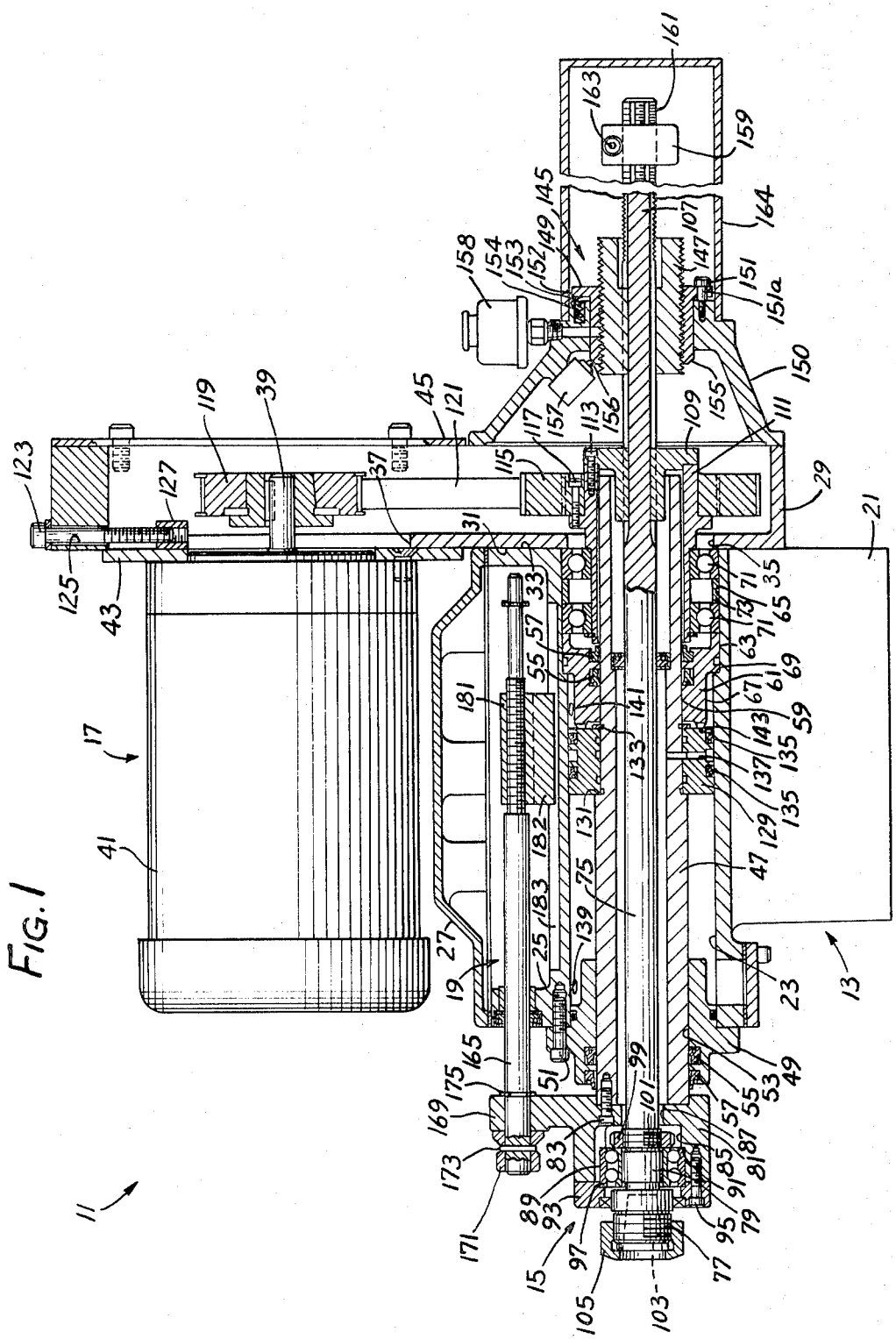
FIG. 1 is a vertical longitudinal sectional view of a tapping apparatus in accordance with a preferred embodiment of the present invention.

Referring now to the drawings, and in particular to FIG. 1 taken in conjunction with FIG. 2, the present invention is illustrated as being embodied in a thread forming apparatus for use in tapping internal threads in or forming external threads on workpieces and the like. The thread forming apparatus is indicated generally at 11 and, in the hereinafter described embodiment, is termed a lead screw tapper which may be employed in conjunction with other metal working apparatus (not shown) all of which may be mounted in a manner to comprise an automatic or semiautomatic multi-station machine tool operative to support one or more workpieces, drill lead holes in the workpieces, tap the lead holes using the apparatus 11, and perform other machining operations as desired. As will become apparent hereinbelow, the structural and functional concepts to be described in connection with the lead screw tapping apparatus 11 may also be readily adapted for external thread forming apparatus.

In general, the lead screw tapper 11 includes frame or housing means, indicated generally at 13; reciprocal tool support means, indicated generally at 15, for supporting a tapping tool; rotary drive means, indicated generally at 17, for effecting selective direct rotation of a spindle of the reciprocal tool support means 15 as will be described more fully below; and control means, indicated generally at 19, which is operative to control reciprocal movement of the tool support means 15 as well as selective rotation of the tapping tool carried by the tool support means during a tapping operation. The lead screw tapper 11 to be hereinafter described employs fluid pressure means to effect a rapid advance stroke and a rapid retract stroke of the tapping tool support means 15 to and from a position placing the tapping tool adjacent a fixed workpiece, and employs a lead screw and feed nut arrangement for effecting controlled forward feeding and retraction of the tapping tool support means so as to feed the tap into a lead hole in the workpiece after the rapid advance cycle.

The housing means 13 includes a pair of spaced depending mounting legs 21 which provide means for mounting the lead screw tapper 11 on a frame structure of an automatic or semi-automatic multi-station machine tool (not shown). The housing means 13 has a cylindrical bore 23 therein which, in the illustrated embodiment, is disposed with its axis horizontal and opens outwardly of both ends of the housing means 13. While the lead screw tapper apparatus 11 will be described hereinafter as having a generally horizontal axis, it will be understood that the inventive concepts underlying the lead screw tapper apparatus may be readily adapted for vertically disposed apparatus. A chamber or recess 25 is provided in the upper surface of the housing means 13 and is capped by a cover plate 27 secured by suitable means such as machine screws (not shown). The chamber or 25 serves to receive and enclose switch actuating members and associated control switches of the control means 19 as will be more fully described hereinbelow.

The housing means 13 includes a drive housing portion 29 of generally rectangular configuration having a vertical surface 31 engageable with a cooperating planar surface 33 normal to the longitudinal axis of the cylindrical bore 23. The drive housing portion 29 of the housing means 13 has a circular opening 35 adjacent the cylindrical bore 23 and has a second circular opening 37 disposed vertically above the opening 35. The opening 37 serves to receive the drive shaft 39 of a reversible electric drive motor 41 of the rotary drive means 17. The electric motor 41 is secured to the drive housing portion 29 of the housing means 13 through a mounting plate 43 and bolts 44 so that the drive shaft 39 is generally centrally disposed relative to the circular opening 37 as shown in FIG. 1. A cover plate 45 is suitably secured to the drive housing portion 29 and is removable to provide access to the elements of the rotary drive means 17 enclosed within the drive housing portion 29 as will be described more fully below.

The housing means 13 serves to support the tool support means 15 for longitudinal reciprocal movement relative to the housing means. To this end, the tool support means 15 includes a generally cylindrical tubular quill 47 which is axially slidably received in and supported by a nose bearing 49 secured to the end of the housing means 13 adjacent the cylindrical bore 23 by screws 51. The nose bearing 49 has a cylindrical bearing surface 53 therethrough which slidingly engages the cylindrical peripheral surface of the left-hand end of the quill 47 to allow longitudinal movement of the quill relative to the nose bearing. The nose bearing 49 has an annular groove therein to retain a conventional seal member 55 which serves to prevent escape of air pressure between the mating surfaces of the quill 47 and the nose bearing bore 53 as will become apparent below. The nose bearing 49 has a second annular groove therein adjacent the left-hand end thereof which retains an annular wiper 57 to prevent damaging contaminants and foreign particles from entering the cylindrical bore 23 as the quill 47 is reciprocated relative to the nose bearing.

The quill 47 has a reduced diameter peripheral surface portion 59 which extends approximately one-half the length of the quill 47 and is slidably supported by a rear bearing member 61 mounted within the cylindrical bore 23 of the housing means 13 adjacent the right-hand end thereof, as shown in FIG. 1. The bearing member 61 has an outer peripheral surface portion 63 seated against a counterbore surface 65 of the bore 23. The rear bearing member 61 has a cylindrical surface portion 67 spaced radially inwardly from the surface of the bore 23 for a purpose which will become apparent below. Annular grooves are provided in the rear bearing 61 to receive an annular seal 55 and an annular wiper 57 which are identical to and serve the same functions as the aforedescribed seal 55 and wiper 57 retained within the nose bearing member 49. The rear bearing member 61 is fixed longitudinally within the housing means 13 by abutment against a radial shoulder surface 69 formed between the stepped cylindrical surfaces 23 and 65. The outer races of a pair of antifrictional ball bearings 71 and an annular spacer 73 are disposed between the right-hand end surface of the rear bearing member 61 and the drive housing portion 29 adjacent the circular opening 35 to retain the rear bearing member against the shoulder 69.

The tool support means 15 includes an elongated cylindrical spindle 75 which is rotatably supported in coaxial relation within the tubular quill 47 for longitudinal movement with the quill. The spindle 75 has an enlarged threaded forward end portion 77 and a slightly reduced diameter portion 79 supported within a bearing housing 81 which is secured to the outer end of the quill 47 by suitable means such as screws, one of which is shown at 83. The bearing housing 81 has a cylindrical bore 85 and an axial circular opening 87 to receive the spindle 75 therethrough. A suitable radial and thrust ball bearing assembly 89 is supported within the bearing housing 81 against a shoulder surface 91 by an end cap 93 secured to the bearing housing 81 by suitable means such as screws 95. The inner race of the bearing assembly 89 is firmly received on the cylindrical surface portion 79 of the spindle 75 and is retained against a radial shoulder 97 on the spindle by a threaded lock nut 99 supported on a threaded portion 101 of the spindle so as to fix the spindle longitudinally relative to the bearing housing 81 and quill 47.

The threaded outer end 77 of the spindle 75 has a tapered internal recess 103 therein to receive a corresponding tapered end portion of a tapping tool, shown at 104 in FIGS. 3 and 4, having conventional thread cutting teeth thereon to cut threads in a workpiece, such as partially illustrated at 106 in FIGS. 3 and 4, which is fixedly positioned outwardly from the outer end of the spindle 75. A retaining nut 105 is threadedly received on the threaded end 77 of the spindle 75 to affix the tapping tool 104 to the spindle in a known manner.

Approximately the rearward one-half length of the spindle 75 is splined at 107. The splined end 107 of the spindle 75 is received through and supported by a spindle drive spline 109 which is fixedly secured to the right-hand or rearward end of an annular drive hub 111 by screw means, one of which is shown at 113. The drive spline 109 is cooperative with the splined end portion 107 of the spindle 75 so as to effect rotation of the spindle upon rotational movement of the drive spline 109 while allowing longitudinal movement of the spindle relative to the drive spine. The annular drive hub 111 is rotatably supported by the housing means 13 coaxial with the spindle 75 through the anti-friction ball bearings 71.

The spindle drive spline 109 and annular drive hub 111 comprise portions of the rotary drive means 17. The rotary drive means 17 further includes a pulley 115 secured on the annular drive hub 111 by suitable means such as screws, one of which is shown at 117. The pulley 115 is connected to a drive pulley 119 mounted on the drive shaft 39 of the reversible electric motor 41 through an endless belt 121. A threaded adjustment screw 123 is received through a suitable opening 125 in the upper end of the drive housing portion 29 and has its lower end threadedly engaged with an adjustment nut 127 which is affixed to the motor mounting plate 43 such that selective rotation of the adjustment screw 123 serves to raise or lower the drive motor 41 and the associated drive pulley 119 to facilitate installation or replacement of the pulley belt 121 and adjustment of the tension therein. In this fashion, the rotary drive means 17 is adapted to effect selective rotary movement of the spindle 75 through the spindle drive spline 109 in either rotational direction.

As noted, the lead screw tapper apparatus 11 includes means for effecting rapid advance and retract strokes of the quill 47 and tool supporting spindle 75 to and from a position placing the tapping tool 104 generally adjacent the fixed workpiece 106. The means for effecting such rapid advance and rapid return strokes of the quill 47 and spindle 75 includes a source of pneumatic pressure (not shown) which may be selectively introduced on either side of an annular piston 129 fixedly supported on the quill 47 against a radial shoulder 131 by a retaining ring 133. A pair of annular seal members 135 are disposed in annular grooves in the outer peripheral surface of the piston 129 and serve to prevent leakage of fluid pressure between the peripheral surface of the cylindrical bore 23 and the piston 129. A pair of fluid pressure ports 139 and 141 are provided in the housing means 13 adjacent the nose bearing 49 and rear bearing 61, respectively, to allow the introduction of fluid pressure against either end of the piston 129. The pressure ports 139 and 141 are connected by suitable means (not shown) to the aforenoted source of pneumatic pressure and may be selectively conditioned to operate as inlet or exhaust ports during operation of the lead screw tapper apparatus 11 as will be described hereinafter. With the quill 47 and spindle 75 disposed in their rearward positions as shown in FIG. 1, the introduction of a predetermined fluid pressure through the pressure port 141 will effect forward longitudinal movement of the quill and spindle outwardly from the housing means 13, the pressure port 139 being then connected to exhaust. Conversely, with the quill 47 and spindle 75 fully or partially extended outwardly from housing means 13, the introduction of fluid pressure through the port 139 will effect rearward movement of the quill 47 and spindle 75 to a position wherein the piston 129 abuts a stop surface 143 on the forward end of rear bearing member 61, the port 141 then being connected to exhaust. A radial bleed hole 137 is provided in piston 129 to allow any fluid pressure bypassing the seals 135 to bleed into the space around the spindle 75 and outwardly of the apparatus.

The aforenoted lead screw and feed nut arrangement for effecting controlled outward feeding of the spindle 75 and tapping tool after the spindle and quill 47 have been moved through a rapid advance stroke is indicated generally at 145. The lead screw and feed nut arrangement 145 includes a lead screw 147 having a threaded outer peripheral surface of predetermined pitch which is threadedly received in and cooperative with the internal threads of a feed nut 149. The feed nut 149 is secured to the rearward end of a generally frusto-conical shaped portion 150 of the drive housing 29 by three equidistantly circumferentially spaced mounting screws, one of which is indicated at 151. The mounting screws 151 are received through suitable openings in a radial flange 152 of the feed nut 149 and have shank portions 151a which allow limited axial movement of the feed nut 149 relative to the housing portion 150, while preventing rotation of the feed nut about its longitudinal axis. A plurality of coil compression springs 153, preferably three in number, are circumferentially spaced between the mounting screws 151 and are received within suitable bores 154 in the housing 150 in a manner to act against the flange 152 of the feed nut 149 and bias the feed nut rearwardly against the heads of the mounting screws 151. In one embodiment of the tapping apparatus 11, the feed nut 149 was mounted so as to be axially movable a distance of 1/16 inch between the heads of the mounting screws 151 and the housing 150.

The feed nut 149 has an annular beveled surface 155 thereon which is adapted to engage and actuate an actuator member 156 of a motor control microswitch 157 secured to and within the housing 150 when the feed nut is moved from its rearward position, as shown in FIG. 1, to a position abutting the housing 150 against the biasing force of the springs 153. The motor control switch 157 serves to control energizing of the reversible electric drive motor 41 as will become more apparent hereinbelow. The preferred control switch 157 is adapted to "open" and "close" upon 0.005 inch movement of the switch actuator member 156.

The lead screw 147 has an internal spline groove cooperative with the splined end 107 of the spindle 75 so as to be rotatable with the spindle 75 while allowing longitudinal movement of the spindle relative to the lead screw 147 and feed nut 149. A lubricating oil receptacle 158 is supported by the housing 150 above the lead screw and feed nut arrangement 145 in a manner to provide lubrication for the interengaging threaded surfaces of the lead screw 147 and feed nut 149.

The spindle 75 carries adjustable stop means comprising an annular stop nut 159 having an internal threaded bore threadedly received on and rotatable along an external threaded end portion 161 of the spindle. The stop nut 159 has a lock screw 163 therein which, upon tightening, serves to lock the stop nut 159 in a selected position longitudinally along the length of spindle 75. The stop nut 159 serves to limit the forward longitudinal movement of the spindle 75 and quill 47 during their rapid advance stroke by abutting the rear end surface of the lead screw 147. The compression springs 153 are selected so that abutment of the stop nut 159 against the lead screw 147 during its rapid advance stroke effects forward movement of the feed nut 149 against the housing 150 to actuate the motor control switch 157. After the stop nut has engaged the lead screw 147 and caused forward movement thereof against the housing 150, rotation of the spindle 75 through the rotary drive means 17 will cause the feed screw 147 to threadedly advance in the feed nut 149 to effect controlled forward feeding of the spindle and quill. The particular peripheral thread on the lead screw 147 is selected such that its pitch is substantially identical to the pitch of the thread to be cut in the workpiece 106 by the tapping tool 104 carried on the forward end of the spindle 75. In this manner, after the spindle 75 and quill 47 have been advanced through the rapid advance stroke, and the spindle and quill are moved longitudinally forwardly by means of the lead screw and feed nut arrangement 145, the tapping tool 104 will be fed into a pre-drilled hole 108 in the workpiece 106 in direct relation to the rotary speed of the spindle 75 and the particular selected thread pitch on the lead screw. A generally cylindrical cover housing 164 is mounted over the rearward end of the spindle 75 and associated stop nut 159 to shield them from contaminants such as dust and the like.

With reference to FIG. 1, taken in conjunction with FIGS. 3 and 4, the control means 19 for controlling reciprocal movement of the tool support spindle 75 and quill 47, and selective rotational movement of the spindle 75, includes a pair of parallel spaced control arms 165 and 167 supported in parallel relation to the longitudinal axis of the spindle 75 by an upstanding leg 169 secured to or formed integral with the bearing housing 81. Each of the control arms 165 and 167 is rotatable about its longitudinal axis and for this purpose has a knurled knob 171 secured to the outer end thereof as by a cross pin 173. A retaining ring 175 is received within a suitable peripheral groove in each of the control arms 165 and 167 to prevent longitudinal movement thereof relative to the upstanding leg 169 of the bearing housing 81. The control arms 165 and 167 extend through suitable sleeve bushings 177 and seals 179 into the recess 25 of the housing means 13 as shown.

The control arm 165 has a switch actuator member 181 threadedly secured thereon for movement with the control arm 165. The actuator member 181 has a lower edge portion 182 received within a groove or slot 183 in the recess 25 to prevent rotation as the control arm 165 is rotated to adjust the position of the actuator member 181 along the length of the control arm 165. The control arm 167 has a switch actuator member 185 threadedly supported thereon and movable therewith, the actuator member 185 having a projection 187 received within a longitudinal slot 189 in the recess 25 to prevent rotation of the actuator member 185 as the control arm 167 is rotated to adjust the actuator member 185 along its length. A sight glass 190 is mounted on the housing means 13 to intersect the slot 189 and provides means for visually observing the exact position of the projection 187 which serves as a position indicator.

A plurality of control switches 191, 193 and 197 are supported by the housing means 13 within the recess 25 for selective actuating engagement by the switch actuating members 181 and 185. The switch 191 is normally open and may be termed the "rapid retract" control switch; the switch 193 is normally open and may be termed the "motor reverse" or "forward limit" switch; and the switch 197 is normally open and may be termed the cycle completion detection switch. The particular mounting positions of the switches 191, 193 and 197, and their relationship with the motor control switch 157 will become apparent from the following description of the pneumatic and electrical control circuits taken in conjunction with the summary of operation.

Noting FIG. 5, wherein the pneumatic control system for effecting rapid advance and rapid retract strokes of the quill 47 and spindle 75 is illustrated schematically, a four-way five-ported air valve 201 is connected in line with the aforenoted source of air pressure supply (not shown) and is normally biased by a compression spring 205 to the condition as shown. The valve spool of valve 201 is actuated by an electrical solenoid 203 between the illustrated normally biased position and a second position opposing the biasing force of the spring 205. A pressure conduit 207 connects the valve 201 to the pressure port 141 on the rearward side of the piston 129, preferably through a suitable flow control valve 209. A pressure conduit 211 connects the valve 201 to the pressure port 139 on the forward side of the piston 129. With the solenoid operated valve 201 in its normal non-energized condition, as shown in FIG. 5, the conduit 211 is connected to the air pressure supply and the conduit 207 is connected to exhaust. Energizing the solenoid 203 connects the conduit 207 to air pressure, and connects the conduit 211 to exhaust. If desired, the exhaust port to which the conduit 211 is connected when the solenoid 203 is energized may have a pressure relief valve (not shown) therein to allow adjustment of the rate of exhaust and thus the rate of travel of the piston 129 and associated spindle 75 in their forward directions of travel.

It can be seen from FIG. 6 that the motor 41 is connected to a conventional 220 or 440 volt three-phase power supply and is operative in a first direction of rotation by closing a first set of relay controlled contacts, indicated generally at 213, while a second set of relay controlled contacts, indicated generally at 215, are open. The rotational direction of motor 41 may be reversed by closing the relay contacts 215 while opening the relay contacts 213, as is known.

Noting FIG. 7, the motor control relay contacts 213 are normally closed and are opened when a "forward" control relay coil 213a is energized. Similarly, the motor control relay contacts 215 are normally closed and are opened when an associated "reverse" control relay coil 215a is energized. As shown, the relay contacts 213 and 215 and their associated control relay coils 213a and 215a are connected such that energizing either of the relay coils 213a or 215a prevents simultaneous energizing of the other motor control relay coil. The motor control relay coil 213a is adapted for connection to a conventional 115 volt A.C. voltage supply, termed the control circuit power supply, through a control switch 217, the normally closed motor relay contacts 215, a normally closed relay contact 219, and the normally open switch 157 such that closing the switch 157 will energize the motor 41 to effect rotation thereof in a first or forward direction. The reverse control relay coil 215a of the motor 41 is connected to the control circuit power supply through the normally closed motor contacts 213, a normally open relay contact 221, and the normally open switch 157. The solenoid 203 is connected to the control circuit power supply through a normally closed relay contact 223 and also through a second branch over the normally open control switch 191. A main control relay coil 225 is connected in circuit with the control circuit power supply through a first circuit branch having a normally open relay contact 227, and through a second branch having the normally open switch 193 therein. The control relay coil 225 controls the relay contacts 219, 221, 223 and 227. When the relay coil 225 is de-energized, the relay contacts 219, 221, 223 and 227 assume their normal positions as described, but when the relay coil 225 is energized, the condition of each of the associated relay contacts is reversed. The control relay 225 is of known design and is latched in a holding state once it is energized.

In operation, with the spindle 75 and quill 47 disposed in their rearward positions as illustrated in FIG. 1, and with the elements of the electrical control circuit being as shown schematically in FIG. 7, closing the control circuit power switch 217 will energize the solenoid 203 such that pneumatic pressure is supplied to the rear of the piston 129 to effect rapid forward longitudinal movement of the quill 47 and spindle 75 to a position wherein the stop nut 159 engages the rear end surface of the lead screw 147. The stop nut 159 is secured along the length of the splined section 107 of spindle 75 to allow rapid forward travel of the spindle to a position wherein the end of the tapping tool 104 is closely adjacent the surface of the fixed aligned workpiece 106. The switch actuating member 181 and the control switch 191 are positioned such that the actuator member 181 closes the switch 191 through its switch arm 191a when the stop nut 159 engages the lead screw 147. The force acting on the piston 129 to move the spindle 75 outwardly from the housing means 13 during rapid advance is sufficient to cause a forward movement of the feed nut 149 to actuate the motor control switch 157 and energize the drive motor 41 in a forward direction. Energizing the drive motor 41 in a forward direction effects rotation of the spindle 75 in a direction to establish forward longitudinal movement of the lead screw 147 within the feed nut 149. As noted above, the pitch of the cooperating threads between the feed screw 147 and the feed nut 149 is selected such that the controlled forward feed of the spindle 75 will feed the tapping tool 104 into the pre-drilled lead hole 108 in the workpiece at the proper rate to provide a thread pitch identical to the pitch of the thread on the lead screw 147.

During tapping of the lead hole 108 in the workpiece 106 air pressure is maintained against the rearward side of the piston 129 so that the thread surfaces on the lead screw 147 and feed nut 149 are continually in the same contacting relation throughout tapping, thus preventing any "play" between the lead screw and feed nut.

The actuator member 185 is positioned on its associated control arm 167 such that when the tapping tool 104 reaches the desired depth in the workpiece, as shown in FIG. 4, the actuator 185 closes the switch 193 to reverse the direction of motor rotation. With reference to FIG. 7, it can be seen that closing switch 193 energizes the control relay 225 which, in turn, then closes relay contacts 221 and 227 and opens the relay contacts 219 and 223. Closing the relay contact 227 maintains the control relay 225 electrically energized or latched so that it will remain energized independent of subsequent opening of switch 193. Opening relay contact 219 de-energizes the motor control coil 213a resulting in closing of the associated motor relay contacts 213. Recalling that the switch 157 was closed by the feed nut 149 during forward advance of the spindle 75, it can be seen that closing the relay contact 221 serves to energize the "reverse" motor control relay 215a and open the motor relay contacts 215 to effect reverse rotation of the drive motor 41.

Reversing the drive motor 41 effects reverse rotation of the spindle 75 and the lead screw 147 within the feed nut 149 to retract the spindle 75 and the tapping tool from the tapped hole. During such retraction of the tapping tool from the workpiece 106, pneumatic pressure contains to be applied to the rearward side of the piston 129 so that "play" is prevented between the threaded cooperating surfaces of the lead screw 147 and feed nut 149. With the spindle 75 rotating in reverse direction, the quill 47 and spindle 75 will retract in direct relation to the pitch of the lead screw 147 and feed nut 149 until the control switch 191 is opened by disengagement from the actuating member 181. Opening switch 191 de-energizes the solenoid 203 to cause pneumatic pressure to be applied against the forward side of the piston 129 whereby to effect a rapid axial retraction of the spindle 75 to its full rearward position. When the air pressure is removed from the rearward side of the piston 129, the feed nut 149 is free to move rearwardly under the bias of the compression springs 153 so as to open the motor control switch 157. Opening switch 157 interrupts the power supply to the motor control relay 215a to stop rotation of the spindle drive motor 41. As the spindle 75 reaches its fully retracted position, the contact arm 197a of the switch 197 is engaged and actuated by the rear end of control arm 165. The switch 197 may be used to determine that the quill and spindle have fully retracted.

Following retraction of the quill 47 and spindle 75, a subsequent tapping cycle or operation can only be effected after the control relay coil 225 is de-energized to revert the relay contacts 219, 221, 223 and 227. This may be accomplished by either opening the control circuit power supply switch 217, or by means of the switch 197 which, upon actuation when the spindle is returned to its fully retracted position, could be employed to open the relay contact 227 to thereby de-energize the main control relay coil 225.

As noted hereinabove, the lead screw tapper apparatus 11 finds particular application where substantially heavier cutting forces are required than needed in what might generally be termed light work. Such, for example, would be the case when the tapped hole is to have a pitch diameter of approximately ½ inch or greater. The additional forces required to effect tapping of such larger diameter holes require substantially larger apparatus components than are required with "light" tapping operations. It has been found that in using the lead screw tapper apparatus 11 in heavier work applications, the direct drive from the drive motor 41 to the spline spindle 75 provides the necessary positive driving force required to effect proper tapping of workpieces. On the other hand, should the forward end of the tap engage a position on the workpiece where no lead hole exists, or enter a lead hole that is "blind," i.e., a lead hole which has not been pre-drilled to the proper depth, the positive drive of the spindle would cause damage to the apparatus 11 as well as the thread forming tool carried by the spindle 75, unless safety means are provided to prevent such damage. In accordance with the above described apparatus 11, if axial feed of the spindle 75 is prevented, continued rotation of the lead screw 147 within the feed nut 149 will cause the feed nut 149 to move rearward and open the control switch 157 to deenergize the drive motor 41. This provides a safety feature to prevent tap damage or undue overload torque forces on the spindle 75 and quill 47 of the apparatus 11.

While a preferred embodiment of the present invention has been illustrated and described, it will be understood to those skilled in the art that changes and modifications may be made therein without departing from the invention in its broader aspects. For example, the tapping tool 104 could be replaced with a suitable thread forming die adapted to form an external thread on a workpiece supported in fixed relation relative to the housing means 13 of the apparatus.

I claim:

1. In an apparatus for use in thread forming and the like, the combination comprising, housing means, at least one spindle supported by said housing means for longitudinal movement, said spindle being adapted to support a tool thereon for selective engagement with a workpiece supported forwardly of the apparatus, rotary drive means, means directly connecting said spindle to said drive means for effecting rotation of said spindle upon rotation of said drive means, a feed nut supported by said housing means in a manner to prevent rotation of said feed nut, a lead screw cooperative with said spindle for rotation therewith while allowing longitudinal movement of said spindle relative to said lead screw, said lead screw being threadedly cooperative with said feed nut such that rotation of said lead screw effects relative longitudinal movement between said lead screw and said feed nut, and control means operatively associated with said rotary drive means and adapted to effect longitudinal movement of said spindle from a first retracted position to a forward position generally adjacent the workpiece during a rapid advance stroke, said control means being further adapted to thereafter energize said drive means to effect rotation of said spindle and lead screw relative to said feed nut to allow further longitudinal movement of said spindle toward the workpiece in direct relation to the pitch of the thread connection between said lead screw and said feed nut, reverse the rotation of said drive means after said spindle has advanced forwardly a predetermined distance to retract said spindle a predetermined distance, stop rotation of said drive means, and return said spindle to its original retracted position through a rapid retract stroke.

2. Apparatus as defined in claim 1 including adjustable stop means supported on said spindle for abutment with said lead screw to limit longitudinal movement of said spindle during said rapid advance stroke.

3. Apparatus as defined in claim 1 including a non-rotatable tubular quill supported by said housing means, said quill supporting said spindle coaxially therein and being secured to said spindle for longitudinal movement therewith.

4. Apparatus as defined in claim 3 wherein said control means includes fluid pressure means cooperative with said quill to effect longitudinal movement of said spindle during said rapid advance and retract strokes.

5. Apparatus as defined in claim 1 wherein said rotary drive means includes a reversible drive motor, and wherein said control means includes circuit means having first switch means adapted to energize said drive motor in a first direction of rotation after said spindle is moved through said rapid advance stroke to effect said relative longitudinal movement between said lead screw and said feed nut to allow said further forward movement of said spindle, said circuit means including second switch means adapted to reverse the direction of rotation of said drive motor to retract said spindle after said spindle has reached said predetermined distance, said first switch means being further adapted to de-energize said drive motor when said spindle has been retracted said predetermined distance, and said circuit means including third switch means adapted to effect a rapid retraction of said spindle to its original rearward position after said spindle has reached said predetermined retracted position.

6. Apparatus as defined in claim 1 wherein said feed nut is supported by said housing means so as to be moved longitudinally forwardly relative to said housing means upon abutment of said stop means with said lead screw during said rapid advance stroke of said spindle, and wherein said control circuit means includes control switch means actuated in response to said longitudinal movement of said feed nut to energize said drive means and effect said rotation of said spindle.

7. Apparatus as defined in claim 6 wherein said lead screw and said feed nut are threadedly cooperable in a manner to allow longitudinal advancing movement of said lead screw relative to said feed nut when no resistance to advancing movement of said spindle is encountered, said feed nut being adapted to move in a rearward direction to de-actuate said control switch means and de-energize said drive means when said spindle is prevented from said advancing movement.

8. In a metal working apparatus for thread forming and the like, the combination comprising, housing means, at least one non-rotatable quill supported by said frame means for reciprocal longitudinal movement, a spindle supported by said quill in coaxial relation therewith for longitudinal movement therewith, said spindle being adapted to support a thread forming tool thereon for selective engagement with a workpiece, reversible rotary drive means, means directly connecting said spindle to said drive means for effecting rotation of said spindle upon rotation of said drive means, threaded feed nut means supported by said frame means, lead screw means cooperative with said spindle for rotation therewith while allowing longitudinal movement of said spindle relative to said lead screw means, said lead screw means being threadedly received through said feed nut means such that rotation of said lead screw means effects longitudinal movement thereof relative to said feed nut means, stop means on said spindle engageable with said lead screw means to limit longitudinal forward movement of said spindle relative to said lead screw means, and control means operatively associated with said drive means and adapted to sequentially effect longitudinal forward movement of said spindle through a rapid advance stroke until said stop means engages said lead screw means, energize said rotary drive means to effect forward longitudinal movement of said spindle and lead screw means relative to said feed nut means a predetermined distance, reverse rotation of drive means to retract said spindle and lead screw means relative to said feed nut means, de-energize said drive means, and thereafter effect rearward longitudinal movement of said spindle through a rapid retract stroke to its initial position preparatory to a subsequent operating cycle.

9. In a metal working apparatus having a spindle supported for reciprocal longitudinal movement between retracted and forward portions, reversible rotary drive means, means directly connecting said spindle to said drive means for effecting selective rotation thereof while allowing longitudinal movement of said spindle, a feed nut, a lead screw longitudinally slidably supported on said spindle through a spline connection for positive rotation therewith and threadedly cooperable with said feed nut, and stop means secured on said spindle for abutment with said lead screw to limit longitudinal movement of said spindle relative to said lead screw; the improvement comprising, control means for effecting selective longitudinal movement of said spindle including first means to move said spindle longitudinally forwardly to a position wherein said stop means abuts said lead screw, said control means being operatively associated with said drive means and including second means to effect energizing of said drive means in a rotary direction to effect forward movement of said spindle a predetermined distance through threaded feeding of said lead screw within said feed nut after engagement of said stop means with said lead screw, said control means including third means operative to reverse the rotational direction of said drive means to retract said spindle said predetermined distance, said second means being adapted to thereafter de-energize said drive means, and said first means being adapted to thereafter effect rapid rearward longitudinal movement of said spindle to its initial position preparatory to a subsequent operating cycle.

10. The improvement of claim 9 wherein said feed nut is moved longitudinally when engaged by said stop means, and wherein said second means includes a control switch actuable by said feed nut when moved longitudinally by said stop means, said control switch being adapted to control energizing of said drive means.

* * * * *